United States Patent
Howard et al.

(10) Patent No.: US 9,777,208 B2
(45) Date of Patent: Oct. 3, 2017

(54) HYDROCARBON-BASED DRILLING FLUIDS CONTAINING CESIUM PHOSPHATE

(75) Inventors: Siv K. Howard, Banchory (GB); John Downs, Lincolnshire (GB)

(73) Assignee: Cabot Specialty Fluids, Inc., The Woodlands, TX (US)

( * ) Notice: Subject to any disclaimer, the term of this patent is extended or adjusted under 35 U.S.C. 154(b) by 60 days.

(21) Appl. No.: 14/125,316

(22) PCT Filed: Jun. 21, 2012

(86) PCT No.: PCT/US2012/043531
§ 371 (c)(1),
(2), (4) Date: Dec. 11, 2013

(87) PCT Pub. No.: WO2013/003192
PCT Pub. Date: Jan. 3, 2013

(65) Prior Publication Data
US 2014/0138160 A1 May 22, 2014

Related U.S. Application Data

(60) Provisional application No. 61/502,388, filed on Jun. 29, 2011.

(51) Int. Cl.
C09K 8/34 (2006.01)
C09K 8/03 (2006.01)
C09K 8/36 (2006.01)
C09K 8/64 (2006.01)
C09K 8/82 (2006.01)

(52) U.S. Cl.
CPC ............. *C09K 8/032* (2013.01); *C09K 8/34* (2013.01); *C09K 8/36* (2013.01); *C09K 8/64* (2013.01); *C09K 8/82* (2013.01)

(58) Field of Classification Search
CPC .......... C09K 8/685; C09K 8/035; C09K 8/36; C09K 8/90; C09K 2208/02; C09K 2208/08; C09K 5/048; C09K 5/10; C09K 8/02; C09K 8/04; C09K 8/206; C09K 8/24; C09K 8/512; C09K 8/64; C09K 8/68; C09K 8/82; C09K 8/887; C09K 2208/10; C09K 2208/12; C09K 3/1463; C09K 8/032; C09K 8/20; C09K 8/22; C09K 8/34; C09K 8/42; C09K 8/50; C09K 8/502; C09K 8/5083; C09K 8/514; C09K 8/528; C09K 8/57; C09K 8/608; C09K 8/62; C09K 8/66; C09K 8/70; C09K 8/72; C09K 8/74; C09K 8/885; C09K 8/905; C09K 8/92; E21B 43/25; E21B 31/03; E21B 2043/0115; E21B 43/26; E21B 43/267
See application file for complete search history.

(56) References Cited

U.S. PATENT DOCUMENTS

| | | | | |
|---|---|---|---|---|
| 4,663,076 A * | 5/1987 | Clapper | ............... | C09K 8/36 507/131 |
| 4,728,444 A * | 3/1988 | Clapper | ............... | C09K 8/36 507/107 |
| 5,755,295 A * | 5/1998 | Hayatdavoudi | ............ | C09K 8/04 175/65 |
| 6,258,756 B1 | 7/2001 | Hayatdavoudi | | |
| 6,562,764 B1 * | 5/2003 | Donaldson | ............... | C09K 8/36 166/278 |
| 2004/0110642 A1 * | 6/2004 | Thompson | ............... | C09K 8/32 507/100 |
| 2005/0199428 A1 | 9/2005 | Dixon | | |
| 2010/0305010 A1 * | 12/2010 | Falana | ................ | C09K 8/06 507/274 |

FOREIGN PATENT DOCUMENTS

| | | | |
|---|---|---|---|
| EP | 2264119 | * | 12/2010 |
| EP | 2264119 A1 | | 12/2010 |
| KZ | 20545 A4 | | 12/2008 |
| RU | 2263701 C2 | | 11/2005 |
| RU | 2388784 C1 | | 5/2010 |

OTHER PUBLICATIONS http://www.glossary.oilfield.slb.com/Terms /e/emulsion.aspx downloaded on Jun. 22, 2016.*
http://www.glossary.oilfield.slb.com/ Terms/w/ water-in-oil_emulsion.aspx downloaded on Jun. 27, 2016.*
International Search Report and Written Opinion issued in corresponding International Patent Application No. PCT/US2012/043531 dated Oct. 4, 2012 (14 pages).
Cabot Specialtiy Fluids (CSF), "Getting heavier with cesium brines," Formate Matters, Aug. 2011, (2 pages).
Office Action dated Jan. 13, 2015 received in corresponding Kazakhstan Application No. 2014/1513.1 and English translation (6 pages).

(Continued)

*Primary Examiner* — Kumar R Bhushan

(57) ABSTRACT

A hydrocarbon-based or ester-based drilling fluid or mud is described wherein the drilling fluid contains cesium phosphate. The hydrocarbon-based or ester-based drilling fluid or mud can have, for example, an external phase that contains hydrocarbon fluid and an internal phase that contains cesium phosphate. The hydrocarbon-based drilling fluid or mud can further contain at least one emulsifier or surfactant, and optionally other ingredients. The present invention can permit hydrocarbon-based drilling fluids to be essentially solids-free and may be used without corrosion and/or formation damage problems, for example, due to the use of the cesium phosphate in an internal phase of the hydrocarbon-based or ester-based drilling fluid. The present invention also relates to hydrocarbon-based or ester-based fluids for completion, workover, suspension and packer operations which contain cesium phosphate.

13 Claims, No Drawings

(56) References Cited

OTHER PUBLICATIONS

International Preliminary Report on Patentability for International Application No. PCT/US2012/043531, with an issuance date of Jan. 7, 2014 from WIPO.
Office Action received in corresponding Chinese Patent Application No. 201280041879.3 dated Sep. 2, 2015 and Search Report dated Aug. 21, 2015 (4 pages).
Liu et al., "Characteristics and applications of completion fluid of cesium formate," Oil Drilling & Production Technology, vol. 29, No. 3, 2007, pp. 91-94 (with English Abstract) (6 pages).
Office Action received in corresponding British Patent Application No. GB1322505.7 dated Nov. 1, 2016 (4 pages).

\* cited by examiner

HYDROCARBON-BASED DRILLING FLUIDS CONTAINING CESIUM PHOSPHATE

This application is a National Stage Application of PCT/US2012/043531, filed on Jun. 21, 2012, which, in turn, claims the benefit under 35 U.S.C. §119(e) of prior U.S. Provisional Patent Application No. 61/502,388, filed Jun. 29, 2011.

BACKGROUND OF THE INVENTION

The present invention relates to hydrocarbon recovery and to the drilling industry and more particularly relates to hydrocarbon-based and ester-based drilling fluids and other fluids used to recover hydrocarbons, which contain cesium phosphate and uses thereof in hydrocarbon recovery operations, such as the drilling and/or completion of a well for the recovery of hydrocarbons or other materials.

In drilling operations, such as the drilling that occurs in oil field operations, such as performed on dry land or offshore using oil platforms, drilling fluids are designed/formulated to serve several functions. These functions include acting as a lubricant to the drill bit to reduce wear and friction during drilling and also to seal the formation surface by forming a filter cake. In the drilling fluid, agents for lubrication typically are present as well as weighting materials in order to achieve a density that typically produces a pressure greater than the surrounding pressure in the well bore. This overpressure is vital for maintaining wellbore stability and well control. The weighting materials can be soluble salts, or finely-ground particles of heavy non-abrasive minerals like barium sulphate (barite). Furthermore, the drilling fluid also typically contains a sealing or fluid loss agent, such as calcium carbonate, polysaccharides, and other polymers, in order to form the filter cake on the formation surface of the well bore. In addition, when the drilling fluids are used during drilling, the drilling fluid will also contain drilling fines, such as shale and sandstone fines.

In the drilling industry, typically water based muds (WBMs), oil-based muds (OBMs), or synthetic-based muds (SBMs) are used in well drilling operations. Water-based muds typically have a continuous water phase into which salts, polymers, and various other chemicals typically are incorporated to create a homogenous blend. With the exception of those based on formate and acetate brines, the water-based drilling fluids may not have operational capabilities suitable for more extreme drilling conditions, such as drilling of deep wells, high pressure/high temperature wells, and the like. Oil-based muds typically include a continuous phase which comprises a hydrocarbon oil (or synthetic oil or ester in the instance of SBMs), a discontinuous phase which typically comprises an aqueous solution, and emulsifiers. Typically, one or more other agents or additives, such as for weight or density, suspension, oil-wetting, lubrication, fluid loss or filtration control, and rheology control, are also included in the oil-based muds.

Once drilling operations have been completed, the well typically is prepared for the completion operations whereby the mud used for drilling is often displaced by a completion fluid. Completion fluids typically are water-based clear fluids and are formulated to the same density as the drilling fluid used to drill the well, in order to retain the hydraulic pressure on the well bore. There are numerous methods of completing a well, amongst which are open hole completions and gravel packed screened systems. The clear fluids are typically halide based brines such as calcium bromide, calcium chloride, and zinc bromide; or organic based brines such as the formate based fluids.

In drilling an oil or gas well, the use of non-aqueous hydrocarbon-based and ester-based drilling fluids should have the inherent advantages of having an external phase fluid in contact with the formation. However, one severe disadvantage to conventional hydrocarbon-based and ester-based drilling fluid is that weighting materials, such as barite, calcium carbonate, or hematite must be added to increase the density of the fluid. These weighting-material solids are capable of inducing formation damage to producing formations. The presence of solids also makes the hydrocarbon-based and ester-based fluids unsuitable for use as completion and workover fluids. The presence of solids in drilling fluids has a negative effect on hydraulics, slowing down drilling rates and creating a risk of fracturing the well bore. Furthermore, high solids levels in drilling fluids can create thick filter cakes and so increase the risk of getting differentially stuck when the drill pipe is stationary for a length of time. The internal aqueous phase of conventional oil-based drilling fluids is typically a concentrated solution of calcium chloride. The presence of high concentrations of chloride salts in oil-based drilling fluids makes then toxic to onshore and inland aquatic environments. The chloride solutions held in invert oil emulsion may also interfere with the nuclear log interpretation during and after drilling.

Thus, the present inventors have determined that there is a need to provide hydrocarbon-based and ester-based drilling and completion/workover fluids that use chloride-free brine and that are preferably solids free or have low solids in the contents in the drilling fluid, in order to avoid the above-mentioned disadvantages.

SUMMARY OF THE PRESENT INVENTION

A feature of the present invention is to provide hydrocarbon-based and ester-based well construction and maintenance fluids (e.g., drilling, completion, and/or workover fluids) which comprise cesium phosphate.

Another feature of the present invention is to provide hydrocarbon-based and ester-based well construction and maintenance fluids which contain cesium phosphate in an internal phase thereof.

A further feature of the present invention is to provide hydrocarbon-based and ester-based well construction and maintenance fluids which contain cesium phosphate in an internal phase thereof, which are solids free or contain low amounts of solids in the drilling fluids.

Another feature of the present invention is to provide hydrocarbon-based and ester-based well construction and maintenance fluids that contain cesium phosphate, which are stable invert emulsions suitable for use as drilling, completion, and workover fluids under a wide range of application conditions, such as in deep wells, high temperature/pressure wells, or other extreme application conditions.

A further feature of the present invention is to provide hydrocarbon-based and ester-based well construction and maintenance fluids which can be adjusted via the brine formulation to have a variety of different densities in order to be useful in a variety of well construction and maintenance situations depending on well depth and/or other variables.

An additional feature of the present invention is to provide hydrocarbon-based and ester-based completion and workover fluids for drilling operations which contain cesium phosphate.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a hydrocarbon-based or ester-based well construction or maintenance fluid which comprises cesium phosphate or a blend of potassium phosphate and cesium phosphate. The hydrocarbon-based or ester-based well construction or maintenance fluid can comprise, for example, an external phase that contains hydrocarbon-based or ester-based fluid and an internal phase that contains cesium phosphate or a blend of potassium phosphate and cesium phosphate. The hydrocarbon-based or ester-based fluid can further contain at least one emulsifier or surfactant. The present invention can permit well construction fluids to be essentially solids-free and/or chloride-free, thus greatly reducing the risk of creating corrosion and/or formation damage and/or hydraulic and/or differential sticking problems, for example, due to the use of the cesium phosphate or a blend of potassium- and cesium phosphate in an internal phase of a hydrocarbon-based or ester-based drilling fluid. The hydrocarbon-based or ester-based well construction fluids of the present invention can further contain other ingredients. Additional alkali phosphates, wetting agents, hydrocarbons, solid weighting materials, sealing or fluid loss agents, filtration control agents, and/or polymers to further control viscosity and/or other conventional additives can be optionally present for purposes of the present invention.

The present invention further relates to a method to construct or repair a well using the above-mentioned hydrocarbon-based or ester-based invert emulsion fluid of the present invention.

The present invention further relates to a method to minimize or eliminate solids in a hydrocarbon-based or ester-based drilling fluid by substituting at least a portion of the solids weighting material with cesium phosphate brine or a blend of potassium- and cesium phosphate brines.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to hydrocarbon-based or ester-based fluids for use in hydrocarbon recovery operations and which comprise cesium phosphate brine or a blend of potassium- and cesium phosphate brine. The so-called well construction and maintenance (repair) fluids can be drilling fluids, completion fluids, workover fluids, fracturing fluids, packer fluids, and/or other fluids useful in drilling and/or well bore operations for hydrocarbon recovery (e.g., oil recovery, gas recovery). For instance, the hydrocarbon-based or ester-based fluid can be used in the drilling of a well for hydrocarbon recovery such as oil and/or gas. The fluid formulations of the present invention can also be used in other well construction and maintenance operations where fluids are pumped into the well bore to provide well control, such as completion and workover operations. It is to be understood that "drilling fluids," as described herein, thus encompass, for purposes of the present invention, all types of fluids used in well bores and subterranean formations for the recovery of hydrocarbons, including, but not limited to, fluids used during the drilling stage (e.g., drilling fluids), completion fluids, workover fluids, fracturing fluids, packer fluids, and the like.

The hydrocarbon-based or ester-based drilling fluids can comprise an external (continuous) organic phase and an inner (discontinuous) aqueous phase which contains cesium phosphate. The hydrocarbon-based or ester-based drilling fluids can contain an external phase comprising a hydrocarbon fluid, an internal phase comprising cesium phosphate or blend of potassium phosphate and cesium phosphate brines, and additionally at least one surfactant or emulsifier. The at least one surfactant or emulsifier, if used, can be present at an interface of the external and internal phases, such as to promote the formation and/or stability of the emulsion. The hydrocarbon-based drilling fluids can be based, for example, on internal aqueous/external hydrocarbon fluid emulsions (referred to herein as "inverts" or "invert emulsions"). The internal aqueous phase of the hydrocarbon-based drilling fluids or muds can comprise, for example, a fluid based on cesium phosphate brine or its blend with potassium phosphate brine.

As an option, a hydrocarbon-based or ester-based drilling fluid which contains the cesium phosphate can be made with very low solids content or zero solids (solids-free) content. Cesium formate, for example, may reach a density of slightly above 1.6 g/cm$^3$ when used in oil-based muds. Cesium phosphate can have a density, for example, of at least about 0.48 g/cm$^3$ higher than cesium formate, and can produce solids-free hydrocarbon-based muds (or fluids) that can have a density above about 2 g/cm$^3$ or other values. As an option, very high density brines can be formed with cesium phosphate or its blend with potassium phosphate brine which can replace at least in part weighting materials which otherwise may be used or needed in hydrocarbon-based or ester-based drilling fluids. Such a solids-free or low-solids fluids make high-performance drilling fluids, or completion, workover, or packer fluids. The low-solids hydrocarbon-based or ester-based drilling fluids which contain cesium phosphate can provide significant benefits, such as higher rates of penetration, less risk of differential sticking, lower circulating pressure losses (e.g. lower ECD) and less damage to the oil/gas reservoir. The water-based cesium phosphate solution, or its blend with potassium phosphate solution, is designed to be a fluid under common handling and drilling conditions. For example, the cesium phosphate-based brine, or its blend with potassium phosphate brine, can be stably maintained in the internal phase of the hydrocarbon-based drilling fluid or muds before and/or during drilling operations. The hydrocarbon-based or ester-based drilling fluids of the present invention can be used as stable invert emulsions, for example, wherein the external and internal phases do not tend to separate out after formation. As the cesium phosphate-containing brine, or its blend with potassium phosphate brine, can be used and maintained in the internal phase of hydrocarbon-based or ester-based drilling fluids, corrosion or formation damage problems can be reduced or avoided. Further, the hydrocarbon-based or ester-based drilling fluids of the present invention can be conveniently and economically prepared in solids-free or low solids formats with accessible high shear mixing methods and equipment with reduced or avoided concerns about dealing with hard or gritty solid particulate contents.

As stated, the hydrocarbon-based drilling fluid can contain, for example, a hydrocarbon fluid or ester-fluid as an external phase and cesium phosphate in an internal brine phase. As used herein, "cesium phosphate" can refer, for example, to any of cesium dihydrogen phosphate, cesium monohydrogen phosphate, cesium dihydrogen pyrophosphate, tricesium phosphate, or any blends thereof. Illustrative empirical formulas which are used for these forms of cesium phosphate are, for example, $CsH_2PO_4$, $Cs_2HPO4$, $Cs_2H_2P_2O_7$, and $Cs_3PO_4$, respectively. These forms of cesium phosphate can be used individually or blended in any ratios. As an option, the "cesium phosphate" can be a blend, for example, of cesium dihydrogen phosphate and cesium monohydrogen phosphate, in any blending ratios thereof. In aqueous solutions or brines, cesium phosphate salts can dissociate, for example, into $Cs^+$ cations and phosphate anions.

Cesium phosphate can be synthesized, for example, by known methods. Cesium phosphate can be synthesized, for example, using known acid-base neutralization reactions between an alkali metal hydroxide solution, a cesium hydroxide (CsOH) solution in this instance, and a strong acid, such as orthophosphoric acid ($H_3PO_4$). Cesium metal is a liquid at or near room temperature, and is highly reactive with air (oxygen), moisture, and cold water. As generally known, cesium metal can react vigorously with water to form a colorless solution of cesium hydroxide (CsOH) and hydrogen gas. Cesium hydroxide monohydrate ($CsOH.H_2O$) also is commercially available, which, as known, can be dissolved in distilled water to provide a CsOH solution. The CsOH solutions are strongly basic because of the dissolved hydroxide. A cesium hydroxide solution can be reacted with a dilute phosphoric acid (e.g., about 3N) to produce cesium phosphate products and water. This reaction is illustrated, for example, by the following equation wherein the reactants are used in equimolar amounts:

$$CsOH_{(aq.)} + H_3PO_{4(aq.)} \rightarrow CsH_2PO_{4(aq.)} + H_2O_{(l)}.$$

Cesium monohydrogen phosphate ($Cs_2HPO_4$) can be produced, for example, by adjusting the above reaction wherein a molar excess of the cesium hydroxide is used for at least part of the reaction. These brine products may be used as is, or may be recovered and isolated as crystalline material and redissolved in water when desired to form brines for use in the drilling fluids of the present invention. Cesium dihydrogen pyrophosphate ($Cs_2H_2P_2O_7$) can be produced by dissolving cesium pyrophosphate (e.g., produced by igniting cesium monohydrogen phosphate) in a solution of glacial acetic acid in water, and heating the solution with stirring and then cooling to precipitate cesium dihydrogen pyrophosphate product. These precipitated products can be recovered and used for brine preparation when desired. The method of synthesis of cesium phosphates suitable for use in hydrocarbon-based or ester-based drilling fluids of the present invention is not limited to any particular reaction pathway. Cesium phosphates can be commercially obtained.

The cesium phosphate brine can be used alone or blended with other brines in the hydrocarbon-based or ester-based drilling fluids of the present invention. The cesium phosphate brine can be blended with at least one different brine to adjust density or for other reasons. The different brine can be, for example, a different alkali metal brine, e.g., a different alkali metal phosphate, or an alkali metal monocarboxylate, or an alkali metal tungstate, or any combinations thereof. Salts of the alkali metals typically are readily soluble in water other than lithium salts. The different brine from cesium phosphate can include one or more alkali metal compounds, for example, cesium formate, cesium acetate, potassium formate, sodium formate, potassium phosphate, sodium phosphate, rubidium phosphate, and/or cesium tungstate, or any combinations thereof. The blending ratios of these brines including cesium phosphate are not particularly limited. A blend of brines which includes cesium phosphate can provide a combined brine which can remain stable in an invert emulsion and which can have a suitable overall density or other performance-related property for the drilling operations. Combinations of different brines which include cesium phosphate may be used to "dial in" various densities in the hydrocarbon-based or ester-based drilling fluids.

As stated, cesium phosphate can be water-soluble and can form very high density brines. When used to produce an internal aqueous phase of the hydrocarbon-based or ester-based drilling fluids, the cesium phosphate concentration can be, for example, any value up to full saturation. The upper limit of the cesium phosphate salt component in the brines can be dependent in part upon the solubility of the cesium phosphate in water. The cesium phosphate brine can be less than fully saturated in the hydrocarbon-based drilling fluid. The internal phase of the hydrocarbon drilling fluid can contain the cesium phosphate in an amount of at least about 5% by weight, or at least about 10% by weight, or at least about 20% by weight, or at least about 30% by weight, or at least about 40% by weight, or at least 50% by weight, or at least 60% by weight, or at least 70% by weight, or from about 10% to about 99% by weight, or from about 20% to about 97.5% by weight, or from about 30% to about 95% by weight, or from about 40% to about 90% by weight, or from about 50% to about 85% by weight, or from about 60% to about 80% by weight, or other amounts, based on the total weight of the internal phase.

Depending on the particular drilling operation, and reasons of emulsion stability, economy, and other factors, a cesium phosphate-containing inner aqueous phase of the hydrocarbon-based drilling fluid can comprise, for example, from about 99% by weight to about 1% by weight cesium phosphate (on a solids basis) and from about 1% by weight to about 99% by weight water, or from about 95% by weight to about 10% by weight cesium phosphate (on a solids basis) and from about from about 5% by weight to about 90% by weight water, or from about 85% by weight to about 20% by weight cesium phosphate (on a solids basis) and from about 15% by weight to about 80% by weight water, or from about 80% by weight to about 40% by weight cesium phosphate (on a solids basis) and from about 20% by weight to about 60% by weight water, or from about 80% by weight to about 60% by weight cesium phosphate (on a solids basis) and from about 20% by weight to about 40% by weight water, or other amounts.

Cesium phosphate brines can be provided, for example, which have a density of at least about 1.9 g/cm³, or at least about 2.0 g/cm³, or at least about 2.1 g/cm³, or at least about 2.2 g/cm³, or at least about 2.3 g/cm³, or at least about 2.4 g/cm³, or at least about 2.5 g/cm³, or at least about 2.6 g/cm³, or at least about 2.65 g/cm³, or from about 1.9 g/cm³ to about 2.75 g/cm³, or from about 2.0 g/cm³ to about 2.7 g/cm³, or from about 2.05 g/cm³ to about 2.68 g/cm³, or from about 2.1 g/cm³ to about 2.65 g/cm³, or from about 2.2 g/cm³ to about 2.6 g/cm³, or from about 2.3 g/cm³ to about 2.5 g/cm³, or other density values. These densities may apply to brine combinations of cesium phosphate with other metal salts.

Although the internal phase of the hydrocarbon-based drilling fluid is shown to include the cesium phosphate and water, the internal phase is not necessarily limited to internal aqueous phases, provided that a fluid medium used for cesium phosphate and any other components of the internal phase which can be emulsified with hydrocarbon fluid to provide invert emulsions, wherein the cesium phosphate can be substantially or completely contained in an internal (discontinuous) phase of the resulting multi-phase drilling fluid.

The external phase of the hydrocarbon-based drilling fluids can comprise a base oil or other hydrocarbon fluids which impart similar properties in the drilling fluids. The hydrocarbon fluid can be, for example, an oleaginous base oil. Examples of the hydrocarbon fluids include, but are not limited to, diesel oil such as diesel oil number 2, mineral oils, crude oil, kerosene, as well as other conventional hydrocarbon fluids. Hydrocarbon fluids used in conventional oil based muds can be used as the external phase of the hydrocarbon drilling fluids of the present invention. Synthetic fluids, such as those used in conventional SBMs, also can be used as the external phase material of the hydrocarbon-based or ester-based drilling fluids of the present invention. Conventional synthetic fluids which can be used include, for example, ethers, esters, olefin oligomers, or blends of these materials. The synthetic fluids can be, for example, (a) esters, which are synthetic oil soluble liquids made by the reaction of a fatty acid (e.g., a vegetable fatty acid) with an alcohol; (b) ethers and polyethers, such as a mono-ether, di-ether or mixture made by condensation and partial oxidation of alcohols; (c) paraffinic hydrocarbons, such as poly-alpha-olefins which are straight chain non-aromatic hydrocarbons which typically are made by polymerization of ethylene; (d) detergent alkylate which is also called a linear alkyl benzene, which is benzene to which a saturated hydrocarbon has been attached, and (e) mixtures of these synthetic hydrocarbon fluids. More specifically, the synthetic fluids can comprise, for example, synthetic oils (such as paraffin oils, olefin oils, vegetable oils, and the like). A non-limiting example of synthetic oil which can be used is IA-35 from Integrity Industries. These synthetic fluids are oil-soluble and normally highly lubricious and can have many of the characteristics of the indicated oils used in conventional OBMs. As will be apparent, this invention can be used in oil-based muds (OBM's) and muds having these synthetic bases (SBM's), which are jointly referred to herein as hydrocarbon-based drilling fluids or muds. Combinations of various oil based fluids or synthetic mud fluids also can be used for the hydrocarbon fluids forming the external phase of the hydrocarbon-based drilling fluids of the present invention.

The hydrocarbon-based drilling fluids can cover all water concentrations wherein an external hydrocarbon phase and internal aqueous phase which contains the cesium phosphate can be provided. Various ratios of the hydrocarbon fluid to the aqueous-based solution described above can be used, for example, such as ratios of from about 99% by volume hydrocarbon fluid: about 1% aqueous based solution to from about 1% by volume hydrocarbon fluid: about 99% by volume aqueous based solution; or about 95% by volume hydrocarbon fluid: about 5% aqueous based solution to from about 60% by volume hydrocarbon fluid: about 40% by volume aqueous based solution; or from about 90% by volume hydrocarbon fluid: about 10% aqueous based solution to about 55% by volume hydrocarbon fluid: about 45% by volume aqueous based solution, or other ratios. More specifically, drilling fluids and muds made with these hydrocarbon fluids and cesium phosphate-containing brines can be inverted emulsions, for example, which contain water (all sources) from about 1% to about 50% by volume, or from about 3% to about 40% by volume, or from about 5% to about 20% by volume, or other volumes, based on the total volume of the drilling fluid. As stated, the water can form an aqueous-based solution which contains the cesium phosphate as an internal (discontinuous) phase in the hydrocarbon fluid forming an external phase of the inverted emulsion.

As stated, the cesium phosphate can be at least partially or totally emulsified as an internal phase into the hydrocarbon-based fluid of the drilling fluid. The internal phase of the hydrocarbon-based drilling fluid can contain, for instance, at least about 75% by weight, or at least about 90% by weight, or at least about 95% by weight, or at least about 97.5% by weight, or at least about 99% by weight up to 100% by weight of the total amount of cesium phosphate present in the hydrocarbon-based drilling fluid. As another option, the cesium phosphate can be present in the hydrocarbon-based drilling fluid in an amount of from about 1% to about 99% by weight, or from about 5% to about 95% by weight, or from about 10% to about 90% by weight, or from about 15% to about 85% by weight, or from about 25% to about 80% by weight, or from about 30% to about 75% by weight, or from about 40% to about 70% by weight, or other amounts, based on the total weight of the drilling fluid.

As an option, in addition to the internal brine phase and hydrocarbon fluid of the external phase, the hydrocarbon-based drilling fluid can include one or more surfactants, wetting agents, organoclays, viscosifiers, fluid loss agents, and/or polymers, or any combinations thereof. The drilling fluid can contain a solid weighting material. Other ingredients used in oil-based or synthetic-based drilling fluids optionally can be used with the hydrocarbon-based drilling fluid or muds of the present invention. Besides the optional ingredients, the remainder of the drilling fluid can be water or other aqueous solutions. The majority of the water or other aqueous solution can form part of the internal phase of the drilling fluid. For example, at least 50%, or at least 75%, or at least 90%, or at least 95%, or at least 98%, or at least 99% by weight or volume of the total water in the drilling fluid can be present in the internal phase thereof.

When the hydrocarbon-based drilling fluid is in the form of an invert emulsion comprising a hydrocarbon fluid as the external phase and an aqueous-based solution containing at least one cesium phosphate as an internal phase, at least one emulsifier or surfactant can be present in order to produce and/or maintain an emulsion of the ingredients. Essentially any emulsifier(s) or surfactant(s) capable of forming an emulsion between the hydrocarbon fluid and the aqueous based solution can be used for purposes of the present invention. As stated above, at least part of the added emulsifier(s) or surfactant(s) can be present at the interface of the external and internal phases of the hydrocarbon-based drilling fluids. The emulsifier(s) or surfactant(s) can be, for example, a dimer trimer acid, imadazoline, tall oil, or combinations thereof. Examples include, but are not limited to, a dimer trimer acid such as Witco DTA 350, imadazoline, tall oil (stearic acid), Integrity Synvert IV, Integrity Synvert TWA, and the like. Any amount of surfactant or emulsifier can be used to form the emulsion such as, for example, from about 1 to about 30 pounds surfactant/emulsifier per barrel, or from about 3 to about 25 pounds surfactant/emulsifier per barrel, from about 5 to about 20 pounds surfactant/emulsifier per barrel, or other amounts, wherein a barrel is about 42 gallons.

Other optional ingredients that can be present in the drilling fluids of the present invention include, for example, a filtration control agent or pore bridging materials such as Gilsonite, and the like. These filtration control agents can be used in conventional amounts.

Other ingredients that can be present in the drilling fluids of the present invention include solid weighting materials such as barite, hematite, and/or calcium carbonate. Calcium carbonate can be commercially obtained, for example, as Baroid Baracarb 50. These solid weighting materials can be used if desired. The amount of solid weighting material, which is optional, can be from about 0.5 pound per barrel to about 500 pounds per barrel. As stated, the use of the cesium phosphate in the internal phase of the hydrocarbon-based drilling fluids can reduce or eliminate the need for solid weighting materials.

Another optional ingredient in the drilling fluids of the present invention is a wetting agent which can be helpful in emulsifying the cesium phosphate fluids with the hydrocarbon-based external fluids. An example of a suitable wetting agent is, for example, Integrity Synvert TWA. Conventional amounts can be used in combination with the emulsifiers described above in order to achieve desired emulsions of the phosphate fluids with the hydrocarbon-base external fluids.

Other ingredients that optionally can be present include, but are not limited to, other drilling fluid products such as polymer(s) to add to viscosity, hydrophilic clays, organophilic clays, fluid loss control additives, amine-treated clays, clays treated such that they provide viscosity in non-aqueous fluids, and the like. These other optional ingredients can be used in conventional amounts known to those skilled in the art.

As stated, the cesium phosphate that is present as part of the aqueous-based solution of the internal phase can be not fully saturated in the aqueous-based solution so as to permit any remaining water-soluble components to preferably solubilize in the solution along with the cesium phosphate. Thus, the cesium phosphate that is present in the aqueous-based solution of the internal phase can be present, for example, in an amount of less than 80% by weight, based on the aqueous-based solution basis, and can be, for example, from about 60% to about 80% by weight, based on the aqueous-based solution basis.

Another advantage of the present invention can be the ability for the density of the drilling fluid to be adjusted to a desired density. As stated, this can especially be done with the introduction of a combination of cesium phosphate with a different metal salt, such as potassium phosphate. As an example, an aqueous-based internal phase portion of the hydrocarbon-based drilling fluid can contain cesium phosphate, which, as stated, can have a density of from about 1.01 g/cm$^3$ to about 2.75 g/cm$^3$. This density range can be adjusted, for example, with the introduction of potassium phosphate or other lower density alkali phosphate or other metal salt, such as a water soluble lower density alkali metal phosphate. As an option, the combination of cesium phosphate with an alkali salt having a lower density results in a combination brine having a density lower than that of cesium phosphate, and which may provide an overall brine density, for example, that is between the densities of the individual component salts. For instance, when 0 to 100% by weight of potassium phosphate is included in the aqueous-based internal phase portion of the hydrocarbon-based drilling fluid, the density of the overall aqueous-based portion of the drilling fluid can range, for example, from about 1.01 g/cm$^3$ to about 2.75 g/cm$^3$, or other values, such as depending on the relative proportions of the constituent brines. Thus, the density of the drilling fluid can essentially be "dialed-in" to meet the density needed for the drilling fluid to be used in the drilling of the well bore at the appropriate depths. For lower density ranges, sodium phosphate can be added to the cesium phosphate, hence, "dialing-in" lower density drilling fluids.

Thus, the hydrocarbon-based drilling fluids of the present invention make it possible to achieve a variety of different densities and to minimize or completely eliminate the solid weighting material that is present in conventional drilling fluids.

The hydrocarbon-based drilling fluids of the present invention can be introduced into the well bore by any conventional technique such as, but not limited to, being pumped into the drill pipe. Further, the hydrocarbon-based drilling fluids can be recovered using conventional techniques.

The hydrocarbon-based drilling fluids of the present invention can be prepared by mixing all of the components together. When an emulsion is prepared, typically, the components can be mixed together such as by shearing in order to ensure a dispersion that is preferably uniform with respect to the components. A static or in-line high shear mixer, for example, can be used to emulsify the components of the hydrocarbon-based drilling fluid to form an external phase comprising the hydrocarbon fluid and an internal phase containing the water and water soluble components including cesium phosphate. High shear mixers generally are known and commercially available for emulsification of hydrocarbon oils and brines, which can be adapted to prepare the invert emulsions of the hydrocarbon-based drilling fluids of the present invention. As an option, a commercial high shear mixer that may be used can be, for example, a Silverson high shear/emulsifier rotor/stator type mixer, such as a Silverson High Shear In-line mixer used on a recirculation basis or a modified Silverson Flashblend mixing system (Silverson Machines, Inc., East Longmeadow, Mass., U.S.A.).

For example, a typical paraffinic hydrocarbon oil such as ESCAID 110, having a density of 0.803 g/cm$^3$ (6.7 lb./gallon) and a cesium phosphate solution having a density of at least about 1.9 g/cm$^3$, for example, when combined in a weight ratio of 1:1 and by addition of an emulsifier or a series of emulsifiers admixed by shearing, the fluids together can produce an emulsion or microemulsion that has a cesium phosphate-containing invert phase or (internal phase) and an oil external phase. The density of the combined mixture of this example can be suitable for drilling operations and/or completion fluids.

Optionally, the hydrocarbon-based drilling fluids or muds of the present invention can contain at least one acid. The acid can be, for example, a water soluble acid containing at least one carboxylic group, such as a formic acid or an acid derivative thereof. Other examples of acids that can be used include, but are not limited to, acetic acid, ascorbic acid, citric acid, tartaric acid, phthalic acid, glycolic acid, and combinations thereof. The acid can be present in various amounts such as from about 1% by weight or less to about 25% by weight or more based on the weight of the hydrocarbon-based drilling fluid. The presence of the acid has the capability of adjusting the pH of the drilling fluid as well as providing other benefits to the hydrocarbon-based drilling fluid. When an acid is present, for instance, the cesium phosphate can be present in any molar amount, such as an amount of about 3 M. Similarly, the acid, when present, can be present in any molar amount, and can be present, for example, in an amount of from about 2.2 M to about 15 M. The pH of the hydrocarbon-based drilling fluid can be any pH.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A hydrocarbon-based or ester-based drilling fluid or mud comprising an external phase comprising a hydrocarbon fluid and an internal phase comprising cesium phosphate, wherein said internal phase comprises a brine containing said cesium phosphate, wherein said internal phase having a density of from about 1.01 $g/cm^3$ to about 2.75 $g/cm^3$ and the cesium phosphate comprises from about 20% to about 85% by weight of said internal phase, and the hydrocarbon-based or ester-based drilling fluid or mud is essentially free of solid weighting material.

2. The hydrocarbon-based or ester-based drilling fluid or mud of claim 1, wherein said cesium phosphate is less than fully saturated in said internal phase of said hydrocarbon-based drilling fluid.

3. The hydrocarbon-based or ester-based drilling fluid or mud of claim 1, further comprising at least one emulsifier or surfactant.

4. The hydrocarbon-based or ester-based drilling fluid or mud of claim 1, further comprising at least one emulsifier or surfactant which is a dimer trimer acid, imadazoline, tall oil, or combinations thereof.

5. The hydrocarbon-based or ester-based drilling fluid or mud of claim 1, wherein the hydrocarbon fluid is diesel oil, mineral oil, synthetic oil, or any combinations thereof.

6. The hydrocarbon-based or ester-based drilling fluid or mud of claim 1, wherein said internal phase further comprises water in an amount of at least about 1% by weight based on weight of said internal phase.

7. The hydrocarbon-based or ester-based drilling fluid or mud of claim 1, further comprising at least one fluid loss additive, at least one wetting agent, at least one filtration control agent, at least one polymer, or any combinations thereof.

8. The hydrocarbon-based or ester-based drilling fluid or mud of claim 1, further comprising at least one different alkali metal salt from said cesium phosphate.

9. The hydrocarbon-based or ester-based drilling fluid or mud of claim 1, further comprising at least one different alkali metal phosphate from cesium phosphate, an alkali metal monocarboxylate, an alkali metal tungstate, or any combinations thereof.

10. The hydrocarbon-based or ester-based drilling fluid or mud of claim 1, further comprising a combination of cesium phosphate having a first brine density and at least one different alkali metal salt from said cesium phosphate having a second lower brine density than the first brine density, wherein the combination of brines has a third brine density having a value between the first and second brine densities.

11. A method to drill a well comprising drilling said well in the presence of the hydrocarbon-based or ester-based drilling fluid or mud of claim 1.

12. A method to recover hydrocarbons from a well bore, comprising utilizing the hydrocarbon-based or ester-based drilling fluid or mud of claim 1.

13. The method of claim 12, wherein said fluid is a drilling fluid, completion fluid, workover fluid, fracturing fluid, well suspension or packer fluid.

* * * * *